United States Patent
Clarke

(10) Patent No.: US 8,142,636 B2
(45) Date of Patent: Mar. 27, 2012

(54) ELECTROCHEMICALLY DESORBING OR ADSORBING CRYPTATE [$^{18}$F] FLUORIDE COMPLEXES

(75) Inventor: Alan Peter Clarke, Oslo (NO)

(73) Assignee: GE Healthcare Limited, Little Chalfont (GB)

( * ) Notice: Subject to any disclaimer, the term of this patent is extended or adjusted under 35 U.S.C. 154(b) by 643 days.

(21) Appl. No.: 12/303,412

(22) PCT Filed: Jun. 9, 2007

(86) PCT No.: PCT/GB2007/002054
§ 371 (c)(1),
(2), (4) Date: Dec. 4, 2008

(87) PCT Pub. No.: WO2007/141506
PCT Pub. Date: Dec. 13, 2007

(65) Prior Publication Data
US 2009/0194428 A1    Aug. 6, 2009

Related U.S. Application Data

(60) Provisional application No. 60/812,160, filed on Jun. 9, 2006.

(51) Int. Cl.
*C25D 5/54* (2006.01)
*C25D 5/00* (2006.01)

(52) U.S. Cl. .......................................... 205/85; 205/87
(58) Field of Classification Search ................... 205/85, 205/87
See application file for complete search history.

(56) References Cited

U.S. PATENT DOCUMENTS

| 5,264,570 A | 11/1993 | Johnson |
| 6,827,838 B2 * | 12/2004 | Hyodo et al. ................. 205/619 |
| 2004/0186312 A1 | 9/2004 | Luthra et al. ................... 560/39 |
| 2005/0167267 A1 | 8/2005 | Hamacher et al. ............ 205/450 |

OTHER PUBLICATIONS

Hamacher et al., "Electrochemical Cell for Separation of [18F]Fluoride From Irradiated 18O-Water and Subsequent No Carrier Added Nucleophilic Fluorination", Applied Radiation and Isotopes (no month, 2002), vol. 56, pp. 516-523.*
Hamacher, K. et.al. "Electrochemical cell for separation of [18F]fluoride from irradiated 18 0-water and subsequent no carrier added nucleophilic fluorination" Applied Radiation and Isotopes, Elsevier, Oxford, GB, vol. 56, 2002, pp. 519-523.
PCT/GB2007/002054 Int'l search report/written opinion dated Dec. 2007.

* cited by examiner

Primary Examiner — Edna Wong

(57) ABSTRACT

The present invention relates to a method of electrochemically desorbing or adsorbing a cryptate [$^{18}$F] fluoride complex using a substituent substituted cryptand A. The present invention also relates to an apparatus and a kit for performing this method. A: which can be used for nucleophilic radiofluorination.

10 Claims, No Drawings

US 8,142,636 B2

ELECTROCHEMICALLY DESORBING OR ADSORBING CRYPTATE [$^{18}$F] FLUORIDE COMPLEXES

This application is a filing under 35 U.S.C. 371 of international application number PCT/GB2007/002054, filed Jun. 9, 2007, which claims benefit to application number 60/812,160 filed Jun. 9, 2006, in the United States the entire disclosure of which is hereby incorporated by reference.

FIELD OF THE INVENTION

The present invention relates to a novel method of electrochemically desorbing or adsorbing a cryptate [$^{18}$F] fluoride complex. The present invention also relates to an apparatus for electrochemically desorbing or adsorbing a cryptate [$^{18}$F] fluoride complex. The present invention further relates to kits for electrochemically desorbing or adsorbing a cryptate [$^{18}$F] fluoride complex.

BACKGROUND OF THE INVENTION

The first major step of nucleophilic radiofluorination is drying the aqueous [$^{18}$F] fluoride which is commonly performed in the presence of a phase-transfer cataylst under azeotropic evaporation conditions (Coenen et al., *J. Labelled Compd. Radiopharm.*, 1986, vol. 23, pgs. 455-467). The [$^{18}$F] fluoride that is solubilized or dissolved in the target water is often adsorbed on an anion exchange resin and eluted, for example, with a potassium carbonate solution (Schlyer et al., *Appl. Radiat. Isot.*, 1990, vol. 40, pgs. 1-6). One cryptate that is available commercially is 4,7,13,16, 21,24-hexaoxa-1,10-diazabicyclo [8,8,8] hexacosan, with the tradename Kryptofix 222. Cryptate is a cage-like agent that has three ether ribs joining the nitrogens at each end. Alkali metals can be held very strongly inside the cage. Cryptate and other macrocyclic complexing agents are known as the "crown" ethers that consist of large puckered rings held together by several ether linkages.

It has been noted that such a complexing agent should be adsorbed at the site of the electrodes and furthermore, these agents could furnish the electrochemist with a useful cationic adsorbate, with a negative desorption potential. Pospisil et al. has demonstrated that a crown complex of $Tl^+$ is adsorbed at a dropping mercury electrode. (Pospisil et al., *J. Electroanal. Chem.*, 1973, vol. 46, pg. 203). Pospisil et al. and Britz et al. demonstrated the use of complex adsorption in the electrosynthesis of tetraethyl lead. (Britz et al., *Electrochem. Acta*, 1968, vol. 13, pg. 347).

Another useful property of alkali metal ion complexes with cryptates is that the complex is reduced at mercury at much more negative potentials than the uncomplexed ion. This has been examined by Peter and Gross who found a potential shift for the $K^+$ complex of about −1V. (Peter et al., *J. Electroanal. Chem.*, 1974, vol. 53. pg. 307).

In Hamacher et al., an electrochemical recovery of n.c.a. [$^{18}$F] fluoride in dipolar aprotic solvents and solutions of phase transfer catalyst is discussed. (Hamacher et al., *Appl. Radiat. Isot.*, 2002, vol. 56, pgs. 519-523). This disclosed recovery process allows the use of a specifically designed electrochemical cell as a reaction vessel for n.c.a. nucleophilic [$^{18}$F]-fluorinations subsequent to [$^{18}$F] fluoride deposition. In other words, Hamacher et al. uses an electrochemical cell within a chamber that comprises two electrodes across which an electric field is applied. The [$^{18}$F] fluoride anions are adsorbed onto the surface of the anode while the [$^{18}$O] water is flushed from the electrode chamber. Hamacher et al. further conclude that a specifically designed electrochemical cell is generally useful for n.c.a. nucleophilic [$^{18}$F]-radiotracer syntheses. Especially in the case of base labeled products like butyrophenones, the electrochemical cell allows cryptate catalyzed [$^{18}$F]-fluorination in the presence of weak basic, less nucleophilic salts like potassium oxalate or triflate.

It is important to note here that a cryptand is a phase-transfer agent used to improve the solubility of [$^{18}$F] fluoride in non-aqueous environments.

Moreover, unlike previous prior art where the adsorption of only cryptands at electrode surfaces have been demonstrated, the present invention presents a method for preparing a robust mono or multi-layers of substituent-substituted cryptands, wherein the mono or multi-layers of electrode-modifying substituent-substituted cryptands can be made via a chemisorption mechanism at open circuit potentials, at the electrode surfaces or via a physisorption mechanism. The cryptate [$^{18}$F] fluoride complex is then electrochemically desorbed or adsorbed from said surfaces by galvanostatic or by potentiostatic means.

In other words, electrochemical reactions can be driven (and controlled ) at the substiuent-substituted cryptand electrode, in one of the following two formats: one can control the current passing through the cells in a galvanostat or one can control the potential in the cells in a potentiostat.

It is important to note that chemisorption and physisorption used herein are defined as follows:

Chemisorption (or chemical adsorption) is adsorption in which the forces involved are valence forces of the same kind as those operating in the formation of chemical compounds. That is to say, it is the adsorptive process between a molecule and a surface in which the electron density is shared by the adsorbed molecule and the surface.

Physisorption (or plysical adsorption) is adsorption in which the forces involved are intermolecular forces (van der Waals forces) and which do not involve a significant change in the electronic orbital patterns of the species involved.

Furthermore, there is a need for creating an electrochemical approach that can increase the yield of [$^{18}$F] fluoride from the use of electrode materials such as gold, platinum, silver or carbon in which these materials could be tailored to inhibit electrochemical reactions with precursors. It is important to note here that once the fluoride cryptand complex is desorbed from the electrode, the now bare gold electrode, for instance, could be used to promote or inhibit labeling reactions.

Discussion or citation of a reference herein shall not be construed as an admission that such reference is prior art to the present invention.

SUMMARY OF THE INVENTION

In view of the needs of the prior art, the present invention provides for a method of electrochemically desorbing or adsorbing a cryptate [$^{18}$F] fluoride complex. More specifically, the substiuent substituted cryptand is adsorbed or desorbed onto an electrode in the absence of fluoride. It is, therefore, essential herein to distinguish [$^{18}$F] fluoride-cryptate from cryptand.

The present invention presents a method of preparing a cryptate [$^{18}$F] fluoride complex comprising an electrode-modifying layer or multi-layers of a substituent-substituted cryptand which is placed on an electrode surface, preferably one electrode surface, and wherein one or more additional electrode surfaces are required in the electrochemical cell and are used for maintaining potential or galvanostatic control of the cryptand-modified electrode. The cryptate [$^{18}$F] fluoride complex is then electrochemically desorbed or adsorbed from said surfaces by galvanostatic or by potentiostatic means.

Yet another embodiment of the present invention encompasses an apparatus for preparing a cryptate [$^{18}$F] fluoride complex comprising mono or multi-layers of a substituent-substituted cryptand which is placed on an electrode surface, preferably one electrode surface, and wherein one or more additional electrode surfaces are required in the electrochemical cell and are used for maintaining potential or galvanostatic control of the cryptand-modified electrode to form a cryptate [$^{18}$F] fluoride complex. The cryptate [$^{18}$F] fluoride complex is then electrochemically desorbed or adsorbed from said surfaces by galvanostatic or by potentiostatic means.

A further embodiment of the present invention claims a kit for preparing a cryptate [$^{18}$F] fluoride complex comprising mono or multi-layers of a substituent-substituted cryptand which is placed on an electrode, preferably one electrode, wherein that electrode contains a cryptand and the other electrode(s), usually one or two, are for electrochemical control to form a cryptate [$^{18}$F] fluoride complex. The cryptate [$^{18}$F] fluoride complex is then electrochemically desorbed or adsorbed from said surfaces by galvanostatic or by potentiostatic means.

DETAILED DESCRIPTION OF THE INVENTION

The current invention sets forth several advantages over previous methods. The present invention utilizes the cryptate [$^{18}$F] fluoride complexes for electrochemical purposes such as solubilization of inorganic salts in solvents of low dielectric constants and increasing the conductivity of such solutions by solubilization as well as the increased dissociation. Cryptate [$^{18}$F] fluoride complexes for electrochemical purposes can also be advantageously used for the difficulty of reducing supporting electrolytes in nonaqueous solvents. Cryptate [$^{18}$F] fluoride complexes can also be used for cationic surfactants that can be desorbed at very negative potentials of about −2 to −4 volts. Additionally, unlike previous methods, the present invention demonstrates fluorination reactions that could be preformed within the electrochemical chamber provided the precursors withstand the low applied electric fields.

An additional characteristic that is an important factor favoring the present inventions method over previous methods include: an electrochemical approach that increases the yield of [$^{18}$F] fluoride from the use of electrode materials such as gold, platinum, silver or carbon in which these materials could be tailored to inhibit electrochemical reactions with precursors.

Further advantages of the present invention include any unwanted electrode reactions—such as a decomposition of precursors—would be more easily inhibited when the electrode is modified as it is herein. The fluoride within the [$^{18}$F] fluoride complexes can be adsorbed faster and more efficiently at the modified electrode disclosed herein. Additional advantages include the use of a cryptand modified electrode that can simplify the process—in other words, the [$^{18}$F] is separated from [$^{18}$O] water and primed for solubilization in an anhydrous solvent in a single step. Additionally, unlike other prior methods, the cryptand is not a separate reagent that needs to be added to the process, but is instead part of the electrode assembly.

Below a detailed description is given of a method for preparing cryptate [$^{18}$F] fluoride complexes, an apparatus for preparing cryptate [$^{18}$F] fluoride complexes as well as preparing a kit for cryptate [$^{18}$F] fluoride complexes.

In one embodiment of the present invention a method of preparing a mono-layer or multi-layers of a substituent-substituted cryptand; and then having one or more electrode surfaces which are required in the electrochemical cell that are used for maintaining potential or galvanostatic control of the cryptand-modified electrode; and thereafter forming the cryptate [$^{18}$F] fluoride complex that is then electrochemically desorbed or adsorbed from said surfaces by galvanostatic or by potentiostatic means is disclosed.

The term "mono-layer" herein is a layer of substiuent-substituted cryptand such as thiol, thiocyanates, sulfides, disulfides, amines, or an aromatic group adsorbed that interacts with an electrode surface. Specifically, the "mono-layer" is a layer whose thickness comprises just a single molecule of the modified substituent-substituted cryptand.

The term "desorbed" herein means to remove (a sorbed substance) by the reverse of adsorption. The term "adsorbed" herein refers to the adhesion in an extremely thin layer of molecules (as of gases, solutes, or liquids) to the surfaces of solid bodies or liquids with which they are in contact.

A further embodiment of the method in the present invention is wherein the substiuent-substituted cryptand is thiol. Yet another embodiment of the invention is wherein the substituent in a substiuent-substituted cryptand is a thiocyanate, or a sulfide-containing group, or a disulfide containing group, or an amine group, or an aromatic group adsorbed to an electrode.

Another embodiment of the present invention depicts a range of mechanisms by which the mono or multi-layer is retained on the electrode surface. The range of mechanisms include chemisorption, physisorption, physical entrapment (with electrochemical entrapment and release), chemical entrapment (with electrochemical entrapment and release) or a similar mechanism. Entrapment used herein means that the cryptand is trapped in a matrix on the electrode surface and that it can be released from the matrix after [$^{18}$F] complexation by physical or chemical means—all controlled by the potential (or current) of the underlying electrode.

Still a further embodiment of the present invention depicts the electrode surface as being planar or porous. In comparison to planar electrodes, porous electrodes provide a much larger surface area. Furthermore, porous electrodes within this invention could greatly improve the efficiency of [$^{18}$F] recovery from [$^{18}$O] water.

Yet a further embodiment presents the electrode surface as being silver, platinum or a combination thereof, or carbon.

An additional embodiment depicts the carbon electrode surface as being glassy, pyrolytic, or graphite.

Still another embodiment encompasses a substituent-substituted cryptand that adsorbs onto silver, platinum, or a combination thereof electrode surface by chemisorption or physisorption.

Yet another embodiment encompasses an electrode surface as being gold.

Still a further embodiment entails the thiol-substituted cryptand mono or multi-layers that are adsorbed onto the gold electrode surface by chemisorption, physisorption, physical entrapment, chemical entrapment or a similar mechanism thereof.

Yet another embodiment of the present invention encompasses an apparatus for preparing a cryptate [$^{18}$F] fluoride complex comprising placing one or more layers of substituent-substituted cryptand onto an electrode surface, wherein one electrode surface is preferred;

adding one or more additional electrode surfaces; and thereafter forming the cryptate [$^{18}$F] fluoride complex which is then electrochemically desorbed or adsorbed from said surfaces by galvanostatic or by potentiostatic means.

A further embodiment contains an apparatus, wherein the the substiuent-substituted cryptand is thiol. Another embodiment depicts a substiuent-substituted cryptand as being a thiocyanate, a sulfide, a disulfide, an amine, or an aromatic group adsorbed to an electrode.

Still another embodiment of the apparatus presents the electrode surface as being planar or porous. In comparison to planar electrodes, porous electrodes provide a much larger surface area. Furthermore, porous electrodes within this invention could greatly improve the efficiency of [$^{18}$F] fluoride recovery from [$^{18}$O] water.

A further embodiment of the apparatus depicts the electrode surface as being silver, platinum or a combination thereof, or carbon wherein the carbon electrode surface is glassy, pyrolytic, or graphite.

Another embodiment of the apparatus presents the sub-stituent-substituted cryptand mono or multi-layers are adsorbed onto the silver, platinum, or a combination thereof electrode surface by chemisorption, physisorption, physical entrapment, chemical entrapment or a similar mechanism thereof.

Yet an additional embodiment of the apparatus presents that the electrode surface is gold.

Still a further embodiment of the apparatus depicts the thiol-substituted cryptands adsorbs mono or multi-layers onto the gold electrode surface by chemisorption, physisorption, physical entrapment, chemical entrapment or a similar mechanism thereof.

A further embodiment of the present invention claims a kit for preparing a cryptate [$^{18}$F] fluoride complex comprising
  placing one or more layers of a substituent-substituted cryptand onto an electrode surface, wherein one electrode surface is preferred;
  adding one or more additional electrode surfaces that are used for maintaining potential or galvanic control of the cryptand-modified electrode; and thereafter
  forming the cryptate [$^{18}$F] fluoride complex which is then electrochemically desorbed or adsorbed from said surfaces by galvanostatic or by potentiostatic means.

In another embodiment claims a kit wherein the substiuent-substituted cryptand is thiol and wherein the substiuent-sub-stituted cryptand is a thiocyanate, a sulfide, a disulfide, an amine or an aromatic group adsorbed to an electrode.

Still another embodiment of the kit claims include the electrode surface as being planar or porous. In comparison to planar electrodes, porous electrodes provide a much larger surface area. Furthermore, porous electrodes within this invention could greatly improve the efficiency of [$^{18}$F] fluoride recovery from [$^{18}$O] water.

Yet another embodiment of the kit claims include the electrode surface is silver, platinum or a combination thereof, or carbon wherein the carbon electrode surface is glassy, pyrolytic, or graphite.

A further embodiment encompasses a kit wherein the substituent-substituted cryptand mono or multi-layers are adsorbed onto the silver, platinum, or a combination thereof electrode surface by chemisorption, physisorption, physical entrapment, chemical entrapment or a similar mechanism thereof.

Still a further embodiment presents the kit claim as having an electrode surface that is gold.

Another embodiment encompasses a kit that presents the thiol-substituted cryptands mono or multi-layers are adsorbed onto the gold electrode surface by chemisorption, physisorption, physical entrapment, chemical entrapment or a similar mechanism thereof.

Yet another embodiment of the present invention encompasses the use of preparing a mono-layer or multi-layers of a substituent-substituted cryptand; and then adding one or more electrode surfaces which are required in the electrochemical cell that are used for maintaining potential or galvanostatic control of the cryptand-modified electrode; and thereafter forming the cryptate [$^{18}$F] fluoride complex that is then electrochemically desorbed or adsorbed from said surfaces by galvanostatic or by potentiostatic means is disclosed.

Still another embodiment of the present invention depicts the use of a cryptate [$^{18}$F] fluoride complex for the manufacture of a diagnostic agent for use in Positron Emission Tomography ("PET"); in a method of placing a layer or layers of a substituent-substituted cryptand onto one electrode surface; adding one or more additional electrode surfaces that are used for maintaining potential or galvanostatic control of the cryptand-modified electrode; and thereafter forming the cryptate [$^{18}$F] fluoride complex which is then electrochemically desorbed or adsorbed from said surfaces by galvanostatic or by potentiostatic means and used in subsequent radio-labelling reactions.

SPECIFIC EMBODIMENTS, CITATION OF REFERENCES

The present invention is not to be limited in scope by specific to embodiments described herein. Indeed, various modifications of the inventions in addition to those described herein will become apparent to those skilled in the art from the foregoing description and accompanying figures. Such modifications are intended to fall within the scope of the appended claims.

Various publications and patent applications are cited herein, the disclosures of which are incorporated by reference in their entireties.

What is claimed is:

1. A method of preparing a cryptate [$^{18}$F] fluoride complex comprising:
  placing a layer of a substituent-substituted cryptand onto a first electrode surface to form a cryptand-modified electrode;
  adding one or more additional electrode surfaces that are used for maintaining potential or galvanic control of the cryptand-modified electrode; and thereafter
  forming the cryptate [$^{18}$F] fluoride complex which is then electrochemically desorbed or adsorbed from said cryptand-modified electrode by galvanostatic or by potentiostatic means.

2. The method according to claim 1, wherein the substiuent-substituted cryptand is thiol-substituted.

3. The method according to claim 2, wherein the first electrode surface is gold.

4. The method according to claim 3, wherein the thiol-substituted cryptand layer is adsorbed onto the gold electrode surface by chemisorption, physisorption, physical entrapment, chemical entrapment or.

5. The method according to claim 1, wherein the substiuent of the substiuent-substituted cryptand is a thiocyanate, a sulfide, a disulfide, an amine, or an aromatic group and the substituent is adsorbed to said first electrode surface.

6. The method according to claim 5, wherein the first electrode surface is made from silver, platinum or a combination thereof, or carbon.

7. The method according to claim 6, wherein the carbon electrode surface is glassy, pyrolytic, or graphite.

8. The method according to claim 5, wherein the substituent-substituted cryptand layer is adsorbed onto the first electrode surface which is a silver, platinum, or a combination thereof electrode surface by chemisorption, physisorption, physical entrapment, chemical entrapment or.

9. The method according to claim 1, wherein the first electrode surface is planar or porous.

10. The method according to claim 1, wherein the layer comprises one or more layers of said substituent-substituted cryptand.

* * * * *